United States Patent [19]

Cooper

[11] Patent Number: 4,912,321
[45] Date of Patent: Mar. 27, 1990

[54] RADIATION SCANNING SYSTEM WITH PUPIL CONTROL

[75] Inventor: Erwin E. Cooper, Dallas, Tex.
[73] Assignee: Texas Instruments Incorporated, Dallas, Tex.
[21] Appl. No.: 285,344
[22] Filed: Dec. 14, 1988

Related U.S. Application Data

[63] Continuation of Ser. No. 30,394, Mar. 26, 1987, abandoned.
[51] Int. Cl.$^4$ ............................................. H01J 3/14
[52] U.S. Cl. .................................. 250/236; 250/334; 350/6.8
[58] Field of Search ................. 250/234–236, 250/334; 350/1.2, 1.4, 6.8

[56] References Cited

U.S. PATENT DOCUMENTS

| | | | |
|---|---|---|---|
| 3,594,578 | 7/1971 | Ohman | 250/234 |
| 4,210,810 | 7/1980 | Berry et al. | 250/347 |
| 4,279,472 | 7/1981 | Street | 250/235 |
| 4,349,843 | 9/1982 | Laakman et al. | 250/236 |
| 4,574,197 | 3/1986 | Kliever | 250/334 |
| 4,674,826 | 6/1987 | Loy | 250/334 |

FOREIGN PATENT DOCUMENTS 2129959A of 0000 United Kingdom .

Primary Examiner—David C. Nelms
Assistant Examiner—Khaled Shami
Attorney, Agent, or Firm—Rene' E. Grossman; Melvin Sharp

[57] ABSTRACT

A radiation scanning system is used with a radiation detector that has a predefined aperture stop. A first relay lens disposed to form a first image of the radiation detector a predefined distance from the aperture stop and a second relay lens is located a predetermined distance from the first relay lens and disposed to form a second image of the radiation detector onto a line scanning apparatus. The line scanning apparatus includes a rotor having a plurality of reflective planar facets disposed uniformly around its circumference. Each of the reflective planar facet has a normal substantially perpendicular to the axis of rotation of the rotor. The rotor is interposed between the second relay lens and the second image of the radiation detector and has its axis of rotation intersecting the optical axis of the second relay lens and disposed in such a way that as the rotor is rotated the second image is caused to move in a substantially circular locus. A concave substantially toroidal mirror is positioned to receive deviated rays from a field lens position on the locus to deviated rays reflected from any given rotational positional position of the rotor onto the concave substantially toroidal mirror. The concave substantially toroidal mirror collimates the reflected rays into a parallel bundle. A frame scanning apparatus is positioned to reflect the parallel bundle of rays in a predtermined direction. The frame scanning apparatus is located at a pupil formed by the intersection of different bundles of parallel rays from the concave substantially tordoial mirror for different rotational positions of the line scanning apparatus.

26 Claims, 4 Drawing Sheets

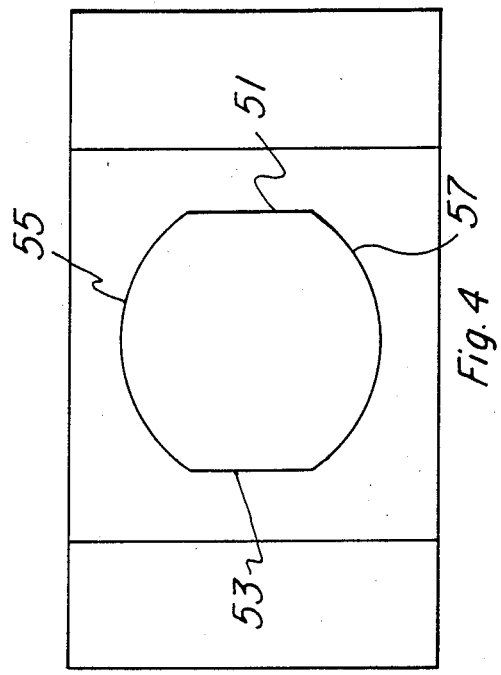

RADIATION SCANNING SYSTEM WITH PUPIL CONTROL

This application is a continuation of application Ser. No. 07/030,394, filed Mar. 26, 1987, now abandoned.

BACKGROUND OF THE INVENTION

This invention relates to radiation scanning systems and of particular importance to radiation scanning systems that require two scanning speeds, a high scanning speed in one direction and a low scanning speed in a second direction. The radiation scanning system of the invention belongs to the class of radiation scanning systems in which a scene is generated by two mechanisms, one operating at the high scanning speed in order to give a scan line and the other operating at a lower scanning speed to give a frame.

U.S. Pat. No. 4,210,810 disclosed a radiation scanning system that includes a detector, a transfer lens forming a real image of the detector, a rotary scanning means interposed between the transfer lens and the detector image in such a way that as the rotary scanning means is rotated, the detector image moves in a circular locus. A concave substantially spherical mirror is concentrically disposed with respect to the detector locus, said locus being at the focal surface of the mirror so that for different rotational position of the rotary scanning means differently directs parallel bundles of rays emanate from the mirror all intersecting at a pupil. A second scanning means is also located at said pupil. The two scanning means provide orthogonal line in frame scans.

U.K. Patent Application GB 2 129 958 also discloses a transfer lens system for a radiation detecting system.

The efficiency of the scan apparatus is determined by the scan rotational angle of a polygon scanner while focused energy is maintained on only one facet of the polygon. The scan efficiency can be improved by positioning the image of the detector close to the scanning surface of the scanner. When this is done light leaving the polygon leaves at a large angle due to the required large rotation angle of the polygon. The larger angle that the energy leaves the reflective facets of the polygon results in a larger collimating mirror such as a spherical mirror and results in increased difficulty in obtaining good imagery.

SUMMARY OF THE INVENTION

A radiation scanning system is disclosed and includes a radiation detector with a predefined aperture stop. A first relay lens is disposed to form a first image of the radiation detector at a predefined distance from the aperture stop and a second relay lens is located a predetermined distance from the first relay lens and disposed to form a second image of the radiation detector onto a line scanning apparatus. The line scanning apparatus includes a rotor having a plurality of reflective planar facets disposed uniformly around its circumference. Each of the reflective planar facet has a normal substantially perpendicular to the axis of rotation of the rotor. The rotor is interposed between the second relay lens and the second image of the radiation detector and has its axis of rotation intersecting the optical axis of the second relay lens and disposed in such a way that as the rotor is rotated the second image is caused to move in a substantially circular locus. A concave toroidal mirror is positioned to received rays from a field lens positioned near the locus to deviate rays reflected from any given rotational position of the rotor onto the concave toroidal mirror. The concave toroidal mirror collimates the reflected rays into a parallel bundle. A frame scanning apparatus is positioned to reflect the parallel bundle of rays in a predetermined direction. The frame scanning apparatus is located at a pupil formed by the intersection of different bundles of parallel rays from the concave toroidal mirror for different rotational positions of the line scanning apparatus.

A first fold mirror is located between the first relay lens and the first image of the radiation detector and a second fold mirror is located between first image and the second relay lens.

The first and second fold mirrors are rotatable about the optical axis between the first and second relay the lenses.

It is the object of this invention to provide a radiation scanning system that controls the location and function of the optical pupils through the entire system.

It is the object of this invention to provide a radiation scanning system having an efficiency of 65% or better.

It is another object of the invention to provide a radiation scanning system in which the size of the line scanning apparatus is reduced through the control of the optical pupils.

It is another object of the invention to provide an improved radiation scanning system having radiation detectors that are perfectly cold shielded.

It is another object of the invention to provide a radiation scanning system in which the cold shield used on the radiation detector operates as an aperture stop.

It is still another object of the invention to provide a radiation scanning system in which a pupil is located on the face of a line scanning apparatus.

These and other objects and advantages of the invention will become more apparent from the reading of the specification in combination with the figures in which:

BRIEF DESCRIPTION OF THE FIGURES

FIG. 4 is an illustration of a pupil, an image of the aperture stop, on the line scanning apparatus of FIG. 1.

DETAILED DESCRIPTION OF THE PREFERRED EMBODIMENTS

Figure 1:
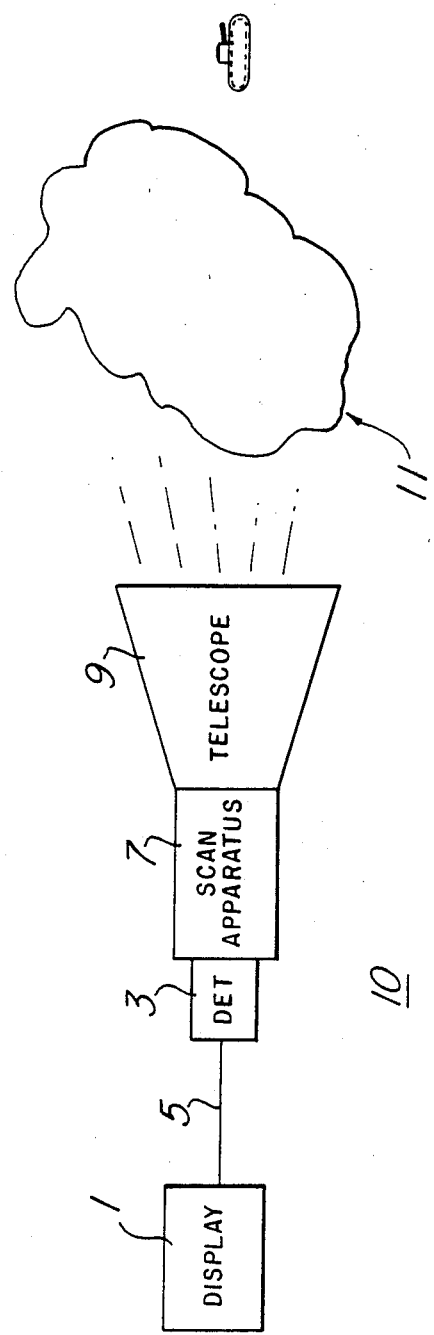
FIG. 1 is a block diagram of a radiation scanning system according to the invention.

FIG. 1 is a simplified block diagram of a radiation scanning system according to the invention in which a scene 11 produces radiation such as that in the thermal infrared region. The radiation is received and magnified by a telescope 9. A radiation scanning apparatus 7 converts the magnified radiation into line and frame radiation scans. A detector 3 receives the line and frame radiation scans (scan information) and converts the radiation to electrical signals representative of the scan information and passes the converted scan information via conductor 5 to a display 1 which may be a device such as a raster scan cathode ray tube that is responsive to the electrical signals. The display then reproduces the scene on the display in a line/frame scan format.

Figure 2:
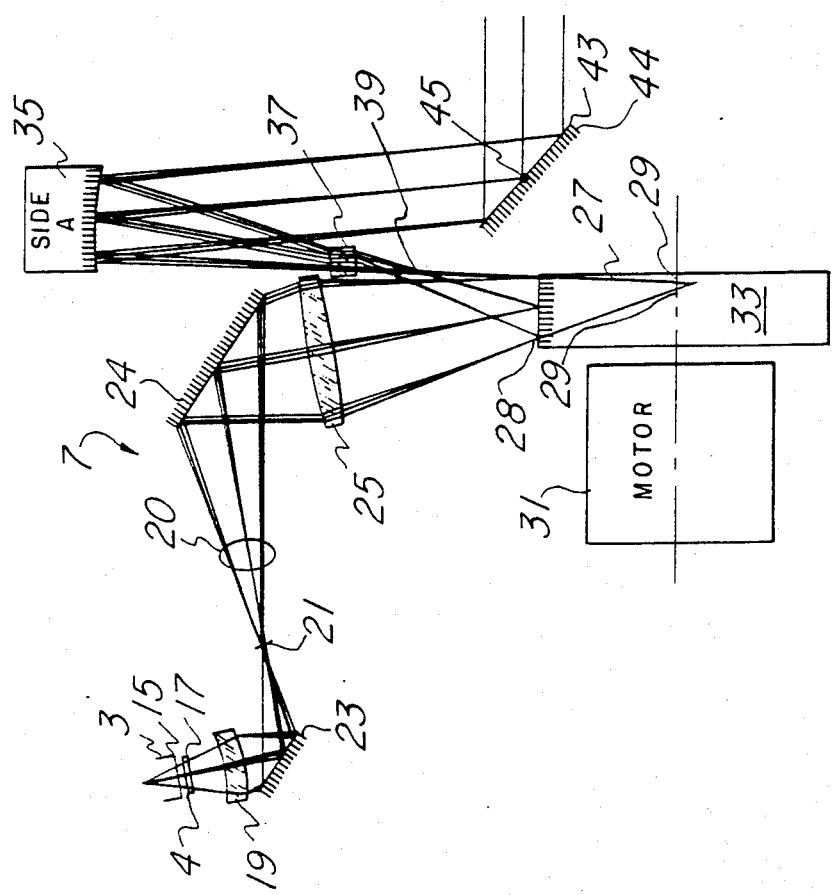
FIG. 2 is a diagram showing the optics of the radiation scanning system of FIG. 1.

FIG. 2 is a diagram illustrating the radiation scanning apparatus 7 and the detector 3. The detector 3 in the embodiment shown in FIG. 2 is a device such as an infrared radiation detector which is chilled to enhance its sensitivity to thermal infrared radiation. A cold shield 15 shields the detector 3 from undesirable radiation from sources outside the optical bundle 20 and includes an aperture 17 through which desired radiation from the scene 11 may pass. The aperture 17 acts as an F stop for the radiation scanning apparatus 7. The detector 3 is closed by a window 4.

Figure 3:
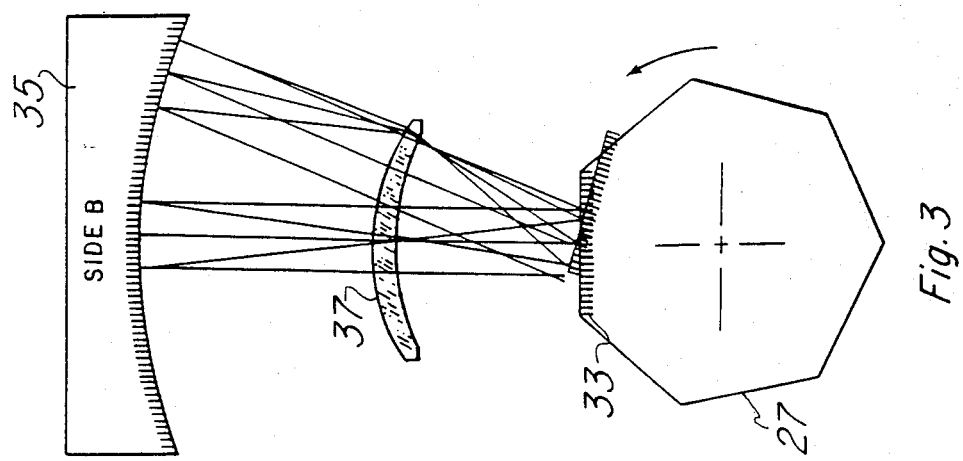
FIG. 3 is a side view of the optics of FIG. 2.

Describing the invention is simplified when the detector 3 as far as the discussions of FIGS. 2 and 3 is concerned, is regarded as a source of radiation which is projected onto the scene 11 by the scanning apparatus 7. Using this orientation, a first relay lens 19 is positioned to relay an image of the detector 3 to image point 21 at which location an image of the detector 3 is created. To minimize the distance between the aperture 17 and the image 21, a fold mirror 23 is inserted in the optical bundle 20. A second relay lens 25 relays the image 21 onto a rotary scan apparatus 27 which in the embodiment of FIGS. 2 and 3 is a polygon scanner. The first relay lens 19 and the second relay lens 25 are aspherical lenses and are selected such that a pupil 28, an image of the aperture stop 17, is formed on the facet 33 of the rotary scan apparatus 27 position in line with optical bundle 20. A plurality of the second image is created along a locus 39 due to the operation of the rotating polygon facets 33 and appear as if originating inside the rotary scan apparatus 27 at approximately point 29. The rotary scan apparatus 27 as was previously stated is a polygon scanner which has in the embodiment shown seven faces and is driven by a motor 31. The rotary scan apparatus 27 is a high speed scanner and is used to generate a line scan of the detector 3. The surfaces 33 of the polygon scanner are reflective and reflect energy emanating from the detector to a toroidal mirror 35 via a field lens 37. As the polygon rotates, it establishes the locus 39 at which the second image of the detector 3 is created. The field lens 37 is positioned to be near the images created on the locus 39 and deviates the images on the locus 39 onto the toroidal mirror 35 which collimates the deviated light onto a frame scan apparatus 41 which includes a mirror 43 that pivots around point 45. The frame scan apparatus 41 is driven by the motor 47 (see FIG. 5) to achieve the frame scan of the detector 3. The position of the frame scan apparatus 41 is defined by the field lens and is located at a pupil, an image of the aperture stop, which is the result of the optical system of the field lens 37 and toroidal mirror 35.

FIG. 3 to which reference should now be made is a side view of the radiation scanning apparatus 7 which shows the operation of the field lens 37 to deviate the line scan images of the detector 3 onto the toroidal mirror 35 from the reflected surfaces 33 of the polygon of the rotary scanner 27. Advantages in using or selecting the appropriate field lens 37 include; control over the location of the pupil 43 and thus the location of the framing mirror 44 by making the light leaving the locus of images 39 appear to originate from a more distant pupil location; a greater choice in the focal length of the collimating mirror (toroidal mirror 35) and/or the field of view of the radiation scanning system 10; and a smaller size collimating mirror which minimizes imaging problems. It is these advantages in conjunction with the use of a toroidal mirror of superior imaging quality over a spherical mirror of like size that allows the polygon scanning apparatus to scan a large rotational angle resulting in a superior scan efficiency.

The use of a double imaging relay lens system that incudes the first relay lens 19. The second relay lens 25 minimizes the size of the pupil 28 on the facet of the polygon which is not possible with a single relay lens. This minimized pupil allows the rotary scan apparatus 27 to scan through a large scan angle without the energy of the pupil being present on two facets 33. This as discussed earlier produces an improved duty cycle and higher efficiency over the prior art systems.

Referring to FIG. 4, the pupil 28 which is an image of the aperture stop 17 shows its shape to reduced the size of the pupil 28 on the facet of the polygon 46 and includes two flats 51 and 53 in parallel alignment with each other. In the embodiment of FIG. 4 the separation between flat 51 and 53 is 0.8 of the diameter of opposite located arch 55 and 57. This results in an aperture stop having only 90% of open area as a circular aperture stop of equal diameter to that of the arc's. The aperture stop 17 of FIG. 4 is positioned so that the flats 51 and 53 are located perpendicular to the direction of rotation of the rotary scan apparatus 27. Since the pupil on the facet 33 is an image of the aperture 17 which in the scan direction is truncated by 20%, the width of the energy from the relay lens 25 is 10% less than that for a circular aperture having the radii of the arcs 55 and 57. With this truncated aperture stop the rotary scan apparatus 27 can scan a larger angle or have a better duty cycle for only a 10% reduction in aperture area.

Figure 6:
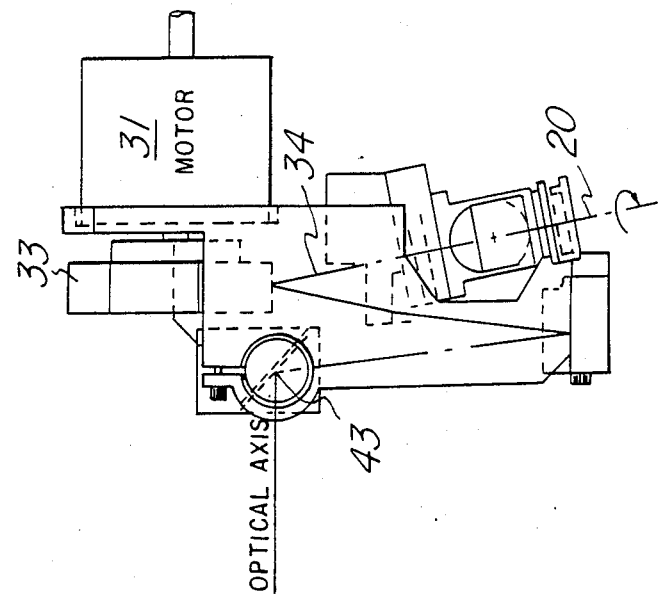
FIGS. 5 and 6 are diagrams of the packaging of the radiation scanning system of FIG. 1.
Figure 5:
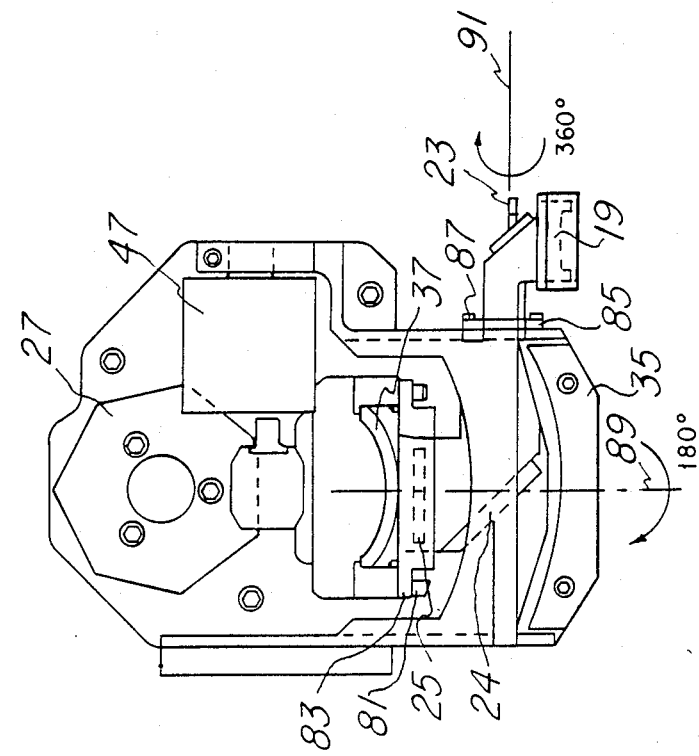

Referring to FIGS. 5 and 6, the first fold mirror 23 and the second fold mirror 24 of FIG. 2 are positioned to shorten the physical distance between the detector 3 and the rotary scan apparatus 27 and to facilitate the location of the detector and any associated cooling apparatus. In the embodiment of FIG. 5 which shows the packaging of the radiation scanner, the fold mirror 24 is positioned to be rotatable located around the optical axis 89. Once positioned fasteners 81 retained flange 83 in place to prevent rotation of the fold mirror 24. This arrangement allows up to 180° of rotation. Similarly, fold mirror 23 can be rotated 360° around the optical axis 91 and is held stationary by flange 85 and fasteners 87.

FIG. 6 is a side view of FIG. 5 and further illustrates the packaging flexibility of the radiation scanning apparatus.

What is claimed is:
1. A radiation scanning system comprising:
a radiation detector having a predefined aperture stop;
a first relay lens disposed to form a first image of the radiation detector;
a second relay lens located a predetermined distance from the first relay lens and disposed to form a second image of the radiation detector and to relay a pupil onto a line scanning apparatus;
the line scanning apparatus including a rotor having a plurality of reflective planar facets disposed uniformly around its circumference and positioned to receive the relayed pupil, each facet having its normal substantially perpendicular to the axis of rotation of the rotor, said rotor being interposed between the second relay lens and the second image of the radiation detector and the rotor having its axis of rotation intersecting the optical axis of the second relay lens, said axis location being disposed in such a way that as the rotor is rotated the second image is caused to move in a substantially circular locus;

a concave substantially toroidal mirror;

a field lens operatively positioned to the substantially circular locus to deviate rays reflected from any given rotational position of the rotor onto the concave substantially toroidal mirror located to receive the reflected rays, the concave substantially toroidal mirror collimates the reflected rays into a parallel bundle and coacts with the field lens to define the location of a second pupil; and a frame scanning apparatus positioned to reflect the parallel bundle of rays in a predetermined direction, the frame scanning apparatus being located at the second pupil.

2. The radiation scanning system according to claim 1 further comprising:

a first fold mirror located in a first optical path between the first relay lens and the first image of the radiation detector.

3. The radiation scanning system according to claim 2, further comprising:

a second fold mirror located a second optical path between the first image of the radiation detector and the second relay lens.

4. The radiation scanning system according to claim 3 wherein the first fold mirror is rotatable mounted around the first optical path and the second fold mirror is rotatable mounted around the second optical path.

5. The radiation scanning system according to claim 1 wherein the field lens is located near at a third pupil created by the reflected rays form the line scanning apparatus.

6. The radiation scanning system according to claim 5 further comprising:

a first fold mirror located in a first optical path between the first relay lens and the first image of the radiation detector.

7. The radiation scanning system according to claim 6, further comprising:

a second fold mirror located in a optical path between the first image of the radiation detector and the second relay lens.

8. The radiation scanning system according to claim 7 wherein the first fold mirror is rotatable mounted around the first optical path and the second fold mirror is rotatable mounted around the second optical path.

9. The radiation scanning system according to claim 1 wherein the aperture stop comprises: an oblong shaped opening having rounded ends of a first radius and parallel sides separated from one another by a distance less than twice the first radius.

10. The radiation scanning system according to claim 9 further comprising:

a first fold mirror located in a first optical path between the first relay lens and the first image of the radiation detector.

11. The radiation scanning system according to claim 10, further comprising:

a second fold mirror located in a optical path between the first image of the radiation detector and the second relay lens.

12. The radiation scanning system according to claim 11 wherein the first fold mirror is rotatable mounted around the first optical path and the second fold mirror is rotatable mounted around the second optical path.

13. A radiation scanning system comprising:

a radiation detector means for converting radiation into an electrical signal and the radiation detector means having a predefined aperture stop for focusing of the radiation to be converted;

a first relay lens means for forming a first image of the radiation detector means;

a second relay lens means located a predetermined distance from the first relay lens means and disposed for forming a second image of the radiation detector means and for relaying a pupil onto a line scanning means;

the line scanning means includes a rotor having a plurality of reflective planar facets disposed uniformly around around its circumference for reflecting rays of radiation and to received the relayed pupil, each facet having its normal substantially perpendicular to the axis of rotation of the rotor, said rotor being interposed between the second relay lens means and the second image of the radiation detector means and the rotor having its axis of rotation intersecting the optical axis of the second relay lens means, said line scanning means being disposed for converting the second image into a line scan of reflected rays;

a concave substantially toroidal mirror means for collimating the reflected rays into a parallel bundle of rays;

a field lens means for deviating the reflected rays reflected from any given rotational position of the rotor onto the concave substantially toroidal mirror means located to receive the reflected rays and for coacting with the concave substantially toroidal mirror to define the location of a second pupil; and a frame scanning means position for reflecting the parallel bundle of rays in a predetermined direction, the frame scanning means being located at the second pupil.

14. The radiation scanning system according to claim 13, wherein the field lens means is operatively located near a third pupil created by the reflected rays form the line scanning means.

15. The radiation scanning system according to claim 13, wherein the aperture stop comprises:

an oblong shaped opening having rounded ends of a first radius and parallel sides separated from one another by a distance less than twice the first radius.

16. The radiation scanning system according to claim 15, further comprising:

a first fold mirror located in a first optical path between the first relay lens means and the first image of the radiation detector means for folding rays of radiation in a first direction.

17. The radiation scanning system according to claim 16, further comprising:

a second fold mirror means located in the first direction between the first image of the radiation detector and the second relay lens means for folding rays of radiation in a second direction.

18. The radiation scanning system according to claim 17, further comprising: means for changing the first and second directions.

19. A method of radiation scanning comprising:

converting radiation into an electrical signal with a radiation detector having a predefined aperture stop;

forming a first image of the radiation detector with a first relay lens means means;

forming a second image of the radiation detector means onto a line scanning means with a a second relay lens means located a predetermined distance from the first relay lens and relaying a pupil onto a line scanning means;

converting the second image into a line scan of reflected rays with the line scanning means, the line scanning means includes a rotor having a plurality of reflective planar facets disposed uniformly around around its circumference for reflecting of rays of the second image and for receiving the pupil, each facet having its normal substantially perpendicular to the axis of rotation of the rotor, said rotor being interposed between the second relay lens means and the second image of the radiation detector means and the rotor having its axis of rotation intersecting the optical axis of the second relay lens means and located between the second relay lens and the second image;

collimating the reflected rays into a parallel bundle of rays with a concave substantially toroidal mirror; and deviating the reflected rays reflected from any given rotational position of the rotor onto the concave substantially toroidal mirror located to receive the reflected rays with a field lens which coacts with the substantially toroidal mirror to define the location of a second pupil; and reflecting the parallel bundle of rays in a predetermined direction with a frame scanning means, the frame scanning means being located at the second pupil.

20. The method according to claim 19, further comprising the step of: limiting the radiation to the radiation detector with a reduced opening aperture stop having an oblong shaped opening having rounded ends of a first radius and parallel sides separated from one another by a distance less than twice the first radius.

21. A forward looking infrared system for processing radiation received from a scene to form an image thereof from the processed radiation, comprising:

(a) a first mirror for scanning the field of view in a first direction along the scene;

(b) a toroidal mirror positioned to receive collimated radiation from said first mirror and provide a curved image plane;

(c) a rotatable polygonal mirror system positioned to receive radiation transmitted from said toroidal mirror;

(d) a field lens positioned between said toroidal mirror and said polygonal mirror system;

(e) a relay lens system for focusing radiation reflected from the polygonal mirror system onto a second image plane; and (f) a detector array for receiving radiation provided to the second image plane.

22. The system of claim 21 wherein said relay lens system is a double imaging relay lens system.

23. The system of claim 22 wherein said double imaging relay lens system comprises two aspherical lenses and a mirror reflecting said image from one of said mirrors to the other of said mirrors.

24. A forward looking infrared system for processing radiation received from a scene to form an image thereof from the processed radiation, comprising:

(a) a toroidal mirror positioned to receive collimated radiation from a scene and provide a curved image plane therefrom;

(b) a rotatable polygonal mirror system positioned to receive radiation transmitted from said toroidal mirror;

(c) a field lens positioned between said toroidal mirror and said polygonal mirror system;

(d) a relay lens system for focusing radiation reflected from the polygonal mirror system onto a second image plane; and (e) a detector array for receiving radiation provided to the second image plane.

25. The system of claim 24 wherein said relay lens system is a double imaging relay lens system.

26. The system of claim 25 wherein said double imaging relay lens system comprises two aspherical lenses and a mirror reflecting said image from one of said mirrors to the other of said mirrors.

* * * * *